Nov. 15, 1932.   C. MORTENSEN   1,888,008
PASTEURIZER MIXER
Filed May 7, 1931   2 Sheets-Sheet 1

Inventor
C. Mortensen,
By D. P. Wolhaupter
Attorney

Nov. 15, 1932.    C. MORTENSEN    1,888,008
PASTEURIZER MIXER
Filed May 7, 1931    2 Sheets-Sheet 2
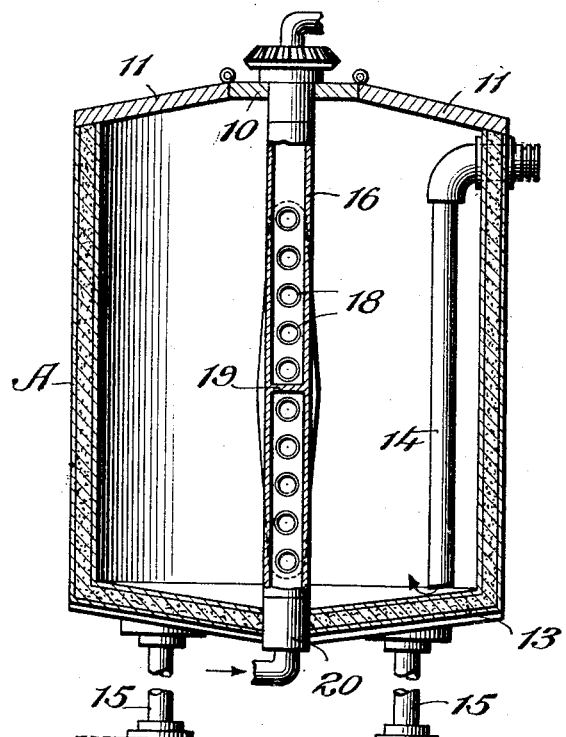
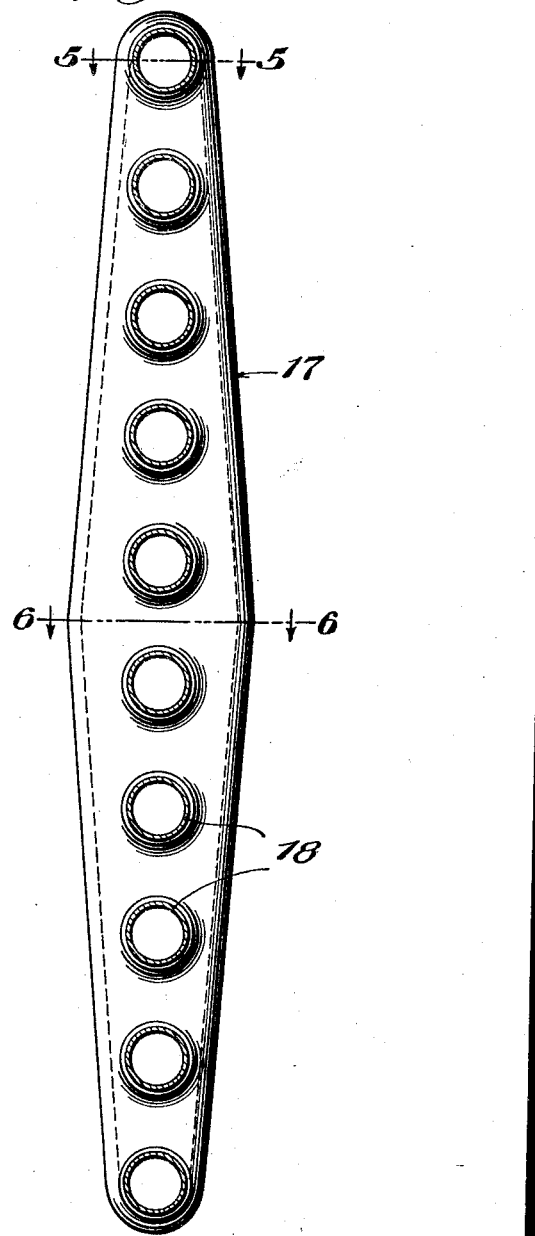
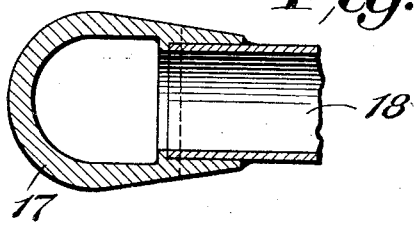
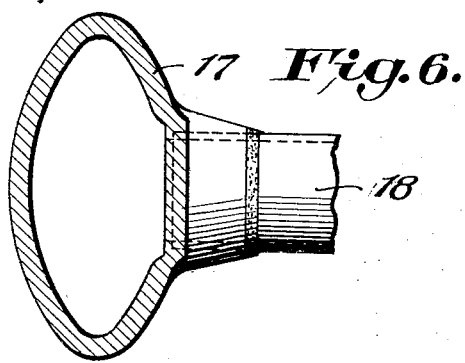
Inventor
C. Mortensen,
By O. P. Wolhaupter
Attorney Patented Nov. 15, 1932

1,888,008

UNITED STATES PATENT OFFICE

CORNELIUS MORTENSEN, OF LOUISVILLE, KENTUCKY

PASTEURIZER MIXER

Application filed May 7, 1931. Serial No. 535,777.

This invention relates to heat exchange apparatus, and has particular reference to a combination stirring and heating or cooling apparatus capable of general use but especially adapted for the treatment of milk.

Generally speaking, the present apparatus comprises a tank or receptacle for the milk or other liquid to be heated or cooled, and hollow stirring means disposed within said tank or receptacle through which means a heating or cooling medium is adapted to be circulated, either to heat or to cool, as may be desired, the milk or other liquid contained in the tank or receptacle.

In connection with apparatus of the foregoing type a special object of the invention resides in so constructing, arranging and moving the stirring means that the effective heating or cooling portions thereof remain submerged in the liquid undergoing treatment during complete cycles of operation of the apparatus, whereby sudden contact of excessively hot or cold portions of the stirring means with the liquid, with consequent scorching or too sudden chilling of the liquid, is avoided.

Another special object of the invention resides in so constructing, arranging and moving the stirring means as to substantially avoid any churning of the milk or other liquid undergoing treatment by said means.

Another important object of the invention resides in the provision of means for circulating large quantities of a heating or cooling medium through the liquid undergoing treatment in a short period of time, and to obtain high heating or cooling efficiency from such medium, to the end of obtaining rapid temperature changes in the liquid being treated.

Another important object of the invention resides in the provision of practical means to utilize the circulating heating or cooling medium as a means of operating the stirring means, thus to provide for economical operation of the apparatus.

A further object of the invention resides in the provision of an apparatus embodying the desirable features aforementioned and which is of relatively simple, inexpensive construction, strong, durable and thoroughly reliable and efficient in use.

With the foregoing and other objects in view, which will become more fully apparent as the nature of the invention is better understood, the same consists in the novel features of construction, combination and arrangement of parts as will be hereinafter more fully described, illustrated in the accompanying drawings and defined in the appended claims.

In the drawings, wherein like characters of reference denote corresponding parts in the different views:—

Figure 3 is a cross section taken on the line 3—3 of Fig. 2.

Figure 4 is an enlarged detail section on the line 4—4 of Fig. 2.

Figure 5 is a cross section on the line 5—5 of Fig. 4; and

Figure 6 is a cross section on the line 6—6 of Fig. 4.

Figure 1:
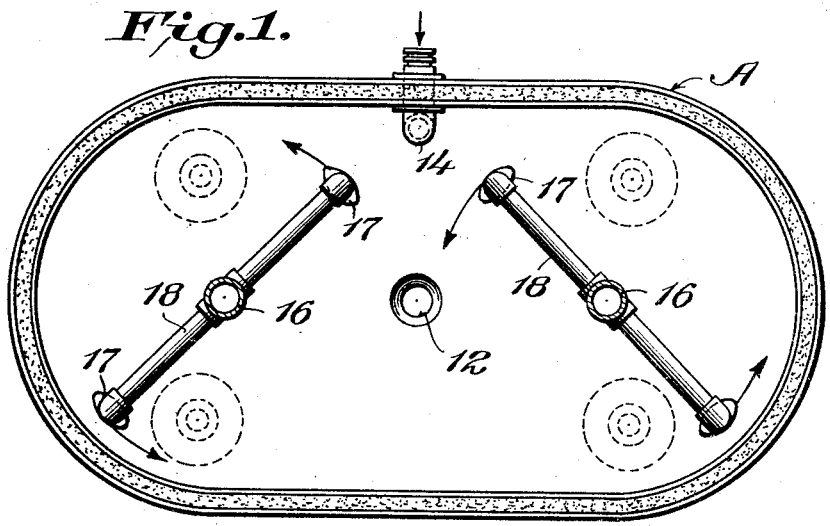
Figure 1 is a top plan view of apparatus embodying the features of the invention, the tank cover being removed.

Referring to the drawings in detail, it will be observed that the present apparatus includes essentially a tank or container, designated generally as A, for the milk or other liquid to be treated, and that said tank or container in accordance with the specific embodiment of the invention illustrated in the present instance, is of somewhat elongated form and provided with rounded ends, the side, end and bottom walls thereof preferably being rendered efficiently heat insulating either by being formed from heat insulating material, or, as shown, by being formed hollow and filled with some suitable heat insulating material such, for example, as ground cork or the like.

Extending from end to end of the tank A at the top thereof and rigidly connected with the end walls thereof is a top closure section 10 which is of less width than the tank, while hinged to the sides of said closure section are other closure sections 11, 11 which are inclined downwardly and outwardly to the side walls of the tank and which cooperate with the section 10 to provide a complete closure for the top of the tank, either of said sections 11 being adapted to be swung upward to afford access to the interior of the tank whenever and for any purpose desired.

An outlet pipe 12 communicates with the tank A through the bottom wall 13 thereof preferably at a point midway between the sides and the ends of the tank, and, as shown, the said bottom wall preferably is well pitched toward said outlet pipe to assure complete drainage of the tank when the same is emptied. On the other hand, the inlet or supply pipe 14 preferably extends through one of the side walls of the tank near the top and intermediate the ends thereof and is directed downwardly within the tank to a point closely adjacent to the bottom thereof, whereby foaming of the milk or other liquid delivered into the tank is practically avoided.

Valves of any suitable type (not shown) are provided for controlling the inlet and the outlet of milk or other liquid through the pipes 14 and 12, respectively, to and from the tank A, and in accordance with the invention said tank preferably is supported on legs 15 which preferably are suitably adjustable in length whereby the tank may be raised or lowered for most convenient use according to the conditions surrounding installation of the apparatus.

Within the tank A are disposed two stirring devices located, respectively, for operation within the respective end portions of the tank. These stirring devices are of duplicate construction and each comprises essentially, a central, vertical tube 16, a pair of vertical manifold elements 17, 17, and a plurality of horizontal tubes 18 connecting the central tube with each manifold element. The manifold elements 17, 17 are disposed at diametrically opposite sides of the central tube 16, and the horizontal tubes 18 connecting each manifold element with the central tube are spaced vertically along said central tube and said manifold elements, the length of the manifold elements approximating the height of the tank A.

At a point between the two innermost horizontal tubes 18 of the respective series of said tubes the central tube 16 is provided with a partition 19 separating the upper part of said central tube from the lower part thereof and preventing direct communication between said tube parts. Therefore, it is apparent that any heating or cooling medium admitted to either end of the central tube 16 must, in order to reach the other end of said tube, flow outward through some of the horizontal tubes 18, through the manifold elements 17, 17 and inward through other of said horizontal tubes. In other words, by reason of the partition 19 being located between the innermost pairs of the tubes 18, it follows that a heating or cooling medium admitted at one end of the central tube 16 to one side of said partition 19 will first flow outward through one-half of the total number of tubes 18 at each side of the central tube, into and through the respective manifold elements 17, 17 and thence inwardly through the other half of the total number of tubes 18 back into the central tube at the opposite side of the partition 19. Thus it is apparent that a large volume of a heating or cooling medium may be circulated through each stirring device within a relatively short period of time, whereby temperature changes in the milk or other liquid contained in the tank A may be rapidly effected.

Regarding the foregoing feature of the present apparatus, it is manifest that all of the heating or cooling medium flowing through one-half of the total number of each series of the tubes 18 to the other half of the total number of tubes comprising the series, must pass through the medial portion of the related manifold element 17. Therefore, in order to provide for a substantially uniform flow of the heating or cooling medium through all of the tubes 18 of each series, the cross sectional area of the manifold elements 17 is progressively increased from the ends toward the medial portions of said elements.

The central tubes 16 of the respective stirring devices are rotatably journaled at their upper and lower ends in suitable bearings 20, 20 carried by the top section 10 and the tank bottom wall 13, respectively, and said bearings are suitably packed or otherwise rendered liquid tight both to prevent escape of liquid from the tank and escape of the heating or cooling medium into the tank. Moreover, said bearings are hollow and in communication with the pipes 16, whereby a heating or cooling medium may be introduced through one of said bearings to one end of the related tube 16 and allowed to escape through the other bearing from the opposite end of the tube, heating or cooling medium inlet and outlet pipes 21, 21 being connected with the bearings 20, 20, respectively.

Figure 2:
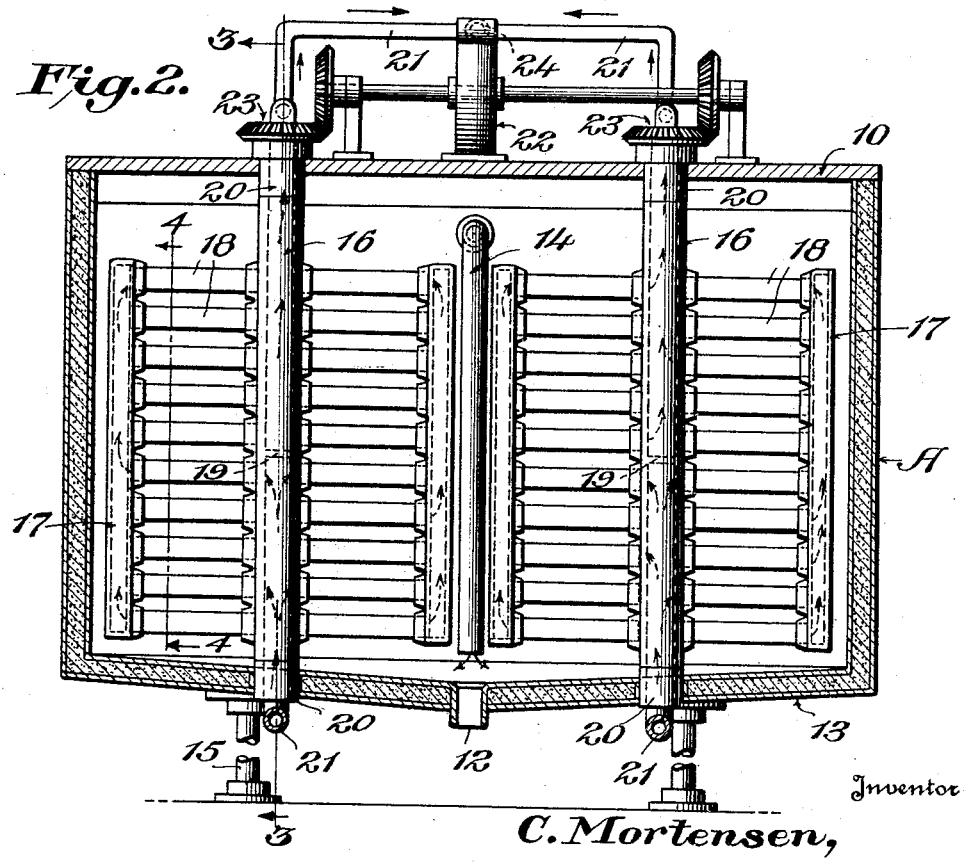
Figure 2 is a central vertical section through the apparatus.

While the stirring devices may be rotated in any suitable or preferred manner, a feature of the invention resides in utilizing the heating or cooling medium that is circulated through said devices for this purpose. As illustrated in Fig. 2 of the drawings a turbine 22 is mounted on the top closure section 10 and is geared to the respective tubes 16 as indicated at 23, 23. The pipes 21, 21 connected with the top bearings 20 lead to and are connected with the turbine, and a valve, designated as 24, is provided whereby some of the heating or cooling medium may be bypassed around the turbine. Thus, only some or all of the heating or cooling medium that is circulated through the tubes 16 may be directed through the turbine to produce rotation of the stirring devices at any desired rate of speed, and as is of course understood, rotation of said stirring devices produces agitation or stirring of the milk or other liquid contained in the tank A in a manner which is apparent.

In the use of the apparatus the tank A may either be filled to completely submerge the stirring devices or to a level between any adjacent pair of the horizontal tubes 18, in which connection it is apparent that any scorching or sudden cooling of the liquid contained in the tank by reason of excessively hot or cold portions of the stirring devices moving into and out of the liquid, as in certain prior types of apparatus of this character is, by the present apparatus, completely avoided. Also it is apparent that the stirring devices may be employed to effect heating or cooling of liquid contained in the tank A regardless of whether said devices are or are not rotated.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. Heat exchange apparatus comprising a receptacle, a tube within said receptacle, a plurality of lateral tubes extending from said first mentioned tube at points spaced along the length of the latter, a partition within said first mentioned tube within the length of that portion thereof from which the lateral tubes extend, and a manifold connecting and providing communication between all of the tubes at their ends remote from the first mentioned tube.

2. In heat exchange apparatus, a tube having a transverse partition therein, a plurality of horizontally disposed tubes extending radially from said first mentioned tube at spaced points therealong to either side of said partition, and means providing intercommunication between the outer ends of all of said laterally extending tubes.

3. In heat exchange apparatus, a tube having a transverse partition therein, a row of tubes extending laterally from said first mentioned tube at spaced points therealong some to one side and some to the other side of said partition, means providing communication between the tubes at opposite sides of said partition, another row of tubes extending laterally from said first mentioned tube at spaced points therealong some to one side and some to the other side of said partition and angularly related to the tubes of the first mentioned row, and means providing communication between the tubes of said second mentioned row at opposite sides of said partition.

4. In heat exchange apparatus, a tube provided with a transverse partition, a plurality of tubes extending laterally from said first mentioned tube at points spaced therealong some to either side of said partition, and a manifold connecting and providing communication between the outer ends of all of said tubes, said manifold increasing in cross sectional area from its points of communication with the lateral tubes disposed most remote from said partition to its points of communication with the tubes disposed nearest said partition.

In testimony whereof I hereunto affix my signature.

CORNELIUS MORTENSEN.